United States Patent [19]

Svenson

[11] 4,266,857
[45] May 12, 1981

[54] LIQUID OR GAS COOLED FLEXIBLE BEAM-COMPENSATING ADJUSTABLE CYLINDRICAL MIRROR

[75] Inventor: Hardy C. Svenson, Arlington, Va.

[73] Assignee: The United States of America as represented by the Secretary of the Treasury, Washington, D.C.

[21] Appl. No.: 116,731

[22] Filed: Jan. 30, 1980

[51] Int. Cl.³ .............................................. G02B 5/10
[52] U.S. Cl. .................................... 350/295; 350/310
[58] Field of Search ........................ 350/288, 295, 310

[56] References Cited

U.S. PATENT DOCUMENTS

| | | | |
|---|---|---|---|
| 3,644,020 | 2/1972 | Shannon | 350/295 |
| 3,836,236 | 9/1974 | Kirk et al. | 350/310 |
| 4,003,640 | 1/1977 | Hansen | 350/310 |
| 4,059,346 | 11/1977 | Levine et al. | 350/295 |
| 4,110,013 | 8/1978 | Eitel | 350/310 |
| 4,143,946 | 3/1979 | Leo et al. | 350/310 |
| 4,190,327 | 2/1980 | Hughes | 350/295 X |
| 4,202,605 | 5/1980 | Heinz | 350/310 X |

OTHER PUBLICATIONS

Ananev et al., "Cylindrical Mirror with a Controlled Radius of Curvature", Soviet Journal of Quantum Electronics, vol. 4, No. 12, Jun. 1975, p. 1471.

Primary Examiner—F. L. Evans
Attorney, Agent, or Firm—Nina M. Lawrence; John R. Manning

[57] ABSTRACT

A liquid or gas cooled adjustable cylindrical mirror (10) for a high powered laser includes a plurality of parallel cooling conduits (20-32) which abut the back surface of the mirror in order to effect heat transfer. The cooling conduits (20-32) are vertically adjustable, and by virtue of their abutting relationship with the flexible mirror are operative to control the curvature of the mirror. A housing (16) for the mirror (10) is provided with a pair of pressure blocks (50) which secure the mirror in position and serve to direct stray photons into the usable area of the reflected beam.

16 Claims, 3 Drawing Figures

LIQUID OR GAS COOLED FLEXIBLE BEAM-COMPENSATING ADJUSTABLE CYLINDRICAL MIRROR

BACKGROUND OF THE INVENTION

1. Field of the Invention

The present invention relates to laser mirrors and, more particularly, to a liquid or gas cooled cylindrical mirror for a high powered laser.

2. Description of the Prior Art

Metallic mirrors are commonly used to focus, deflect or change the shape of laser beams. A problem associated with the use of such metallic reflectors is the absorption of incident beam energy by the mirror surface and the resulting thermal distortion of the optical reflective surface. Typically, the mirrors which are subjected to intense heat by the laser beam require cooling of the reflective surface since only minimal thermal distortion due to differential temperatures can be permitted. Examples of liquid-cooled mirrors include U.S. Pat. No. 4,143,946 to Leo et al, and U.S. Pat. No. 3,836,236 to Kirk et al. Kirk et al discloses a cooling means in the form of an elongated cooling passage, which is located in the central part of the backing plate of a mirror, and a mirror mounting means which includes an outer mounting ring having an inwardly projecting annular lip defining a shoulder for receiving and positioning a disc-like mirror. Leo et al discloses a cooled deformable laser mirror which uses an inlet manifold and a plurality of spraying nozzles for cooling the rear surface of the mirror. In addition, Leo et al discloses the use of electro-magnetic actuators which are used to exert a force on the rear surface of the mirror to thereby modify the geometry thereof.

A disadvantage of the fluid cooled laser mirrors of the prior art is that separate means have to be provided for cooling the mirror and for adjusting its curvature. This disadvantage is obviated by the system of the present invention whereby vertically adjustable cooling conduits may be used both to effect heat transfer away from the mirror surface and to adjust the mirror geometry to compensate for the fading effect at the outer edges of a laser beam.

Further examples of prior art which deal with the cooling and curvature control of an optical reflecting surface are U.S. Pat. No. 4,059,346 to Lavine et al, U.S. Pat. No. 4,003,640 to Hanson, U.S. Pat. No. 3,664,020 to Shannon, U.S. Pat. No. 4,110,013 to Eitel and the article "Cylindrical Mirror with a Controlled Radius of Curvature", by Yu. A. Ananev and Ve Sherstobitov, appearing in *Soviet Journal of Quantum Electronics,* Vol. 4, No. 12, June 1975.

SUMMARY OF THE INVENTION

An object of this invention is the provision of an improved cooling means for a laser mirror.

Another object of the invention is to provide means for adjusting the geometry of a cylindrical optical mirror.

An additional object of the invention is to provide a laser mirror with retaining means which are operable to direct stray photons into the usable area of the reflected beam.

A further object of the invention is to provide a mirror assembly which will provide thermal and mechanical control over the optically reflective surface in order to obtain accurate laser beam reflection in a simple and effective manner.

These and other objects are attained in the present invention by providing an adjustable cylindrical mirror which includes a plurality of parallel, vertically adjustable cooling conduits which abut the back surface of the laser mirror in order both to effect heat transfer from the mirror surface and also to control the curvature thereof.

DETAILED DESCRIPTION OF THE PREFERRED EMBODIMENT

Figure 1:
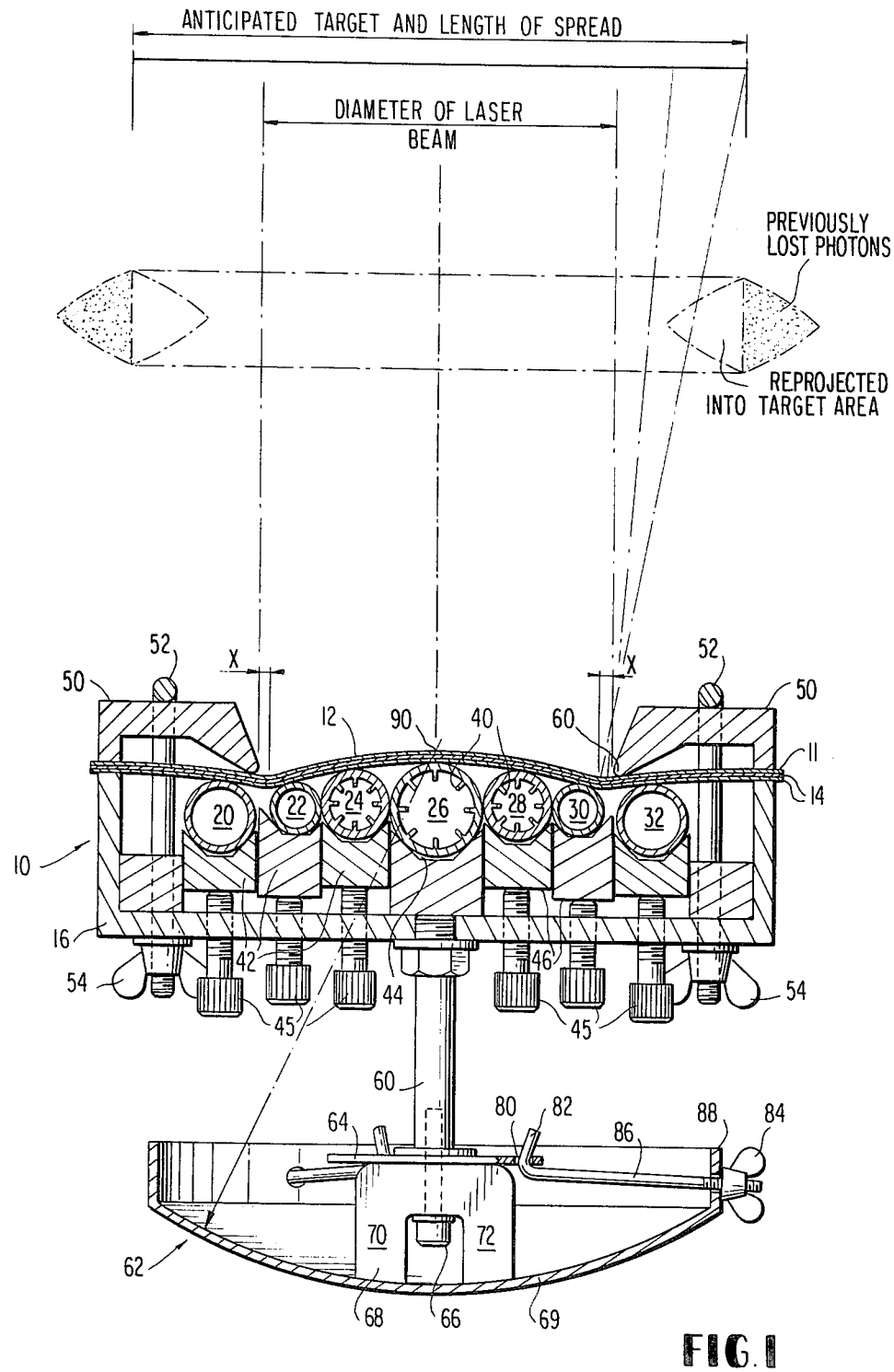
FIG. 1 is a cross sectional view of the laser mirror and the supporting base structure therefor.

Referring now to the drawing, a mirror assembly 10 contains an optically reflective surface 12 of cylindrical curvature. The mirror is formed as a laminated member, the upper layer 11 of which is provided with a reflective metallic surface 12 of copper, gold or the like. The remaining layers 14 are heat distributing plates which are manufactured of a material such as copper or the like which demonstrates a high degree of heat conductivity. In this manner, heat which is generated by the absorption of incident laser light energy is uniformly distributed over the surfaces of conductive layers 14, thereby avoiding mirror deformation due to temperature differences. Cooling of the mirror surface is effected by means of cooling conduits which are supplied with a suitable coolant, e.g. liquid or gas, in circulating fashion as well known in the art.

The mirror is supported within a housing 16 in which a plurality of generally parallel cooling conduits 20, 22, 24, 26, 28, 30 and 32 are arranged in the area behind the mirror surface. The conduits are arranged in an abutting relationship with the plates 14 and serve to conduct heat away therefrom. To provide an efficient heat exchange, the conduits may be provided internally with a plurality of radially disposed radiating fins 40 to increase the effective internal surface area thereof in contact with the circulating fluid.

The cooling conduits are supported within the housing 16 by means of a plurality of guide blocks 42 which are formed of a generally non-conductive or insulating material so as not to thermally affect the cooling conduits. The blocks 42 may be provided with channels 44 to serve as a locating means for the conduits.

As seen in FIG. 1, the blocks 42 are arranged in a side-by-side fashion with a small clearance provided therebetween. In this manner, the blocks are maintained parallel to one another, while allowing for relative vertical movement between adjacent blocks.

The blocks 42 are provided with a plurality of thumb screws 45 abutting their bottom surfaces 46 at several points along the length thereof to provide for vertical adjustability. The thumb screws extend through the bottom of the housing 16 such that they may easily be manipulated by hand.

Figure 2:
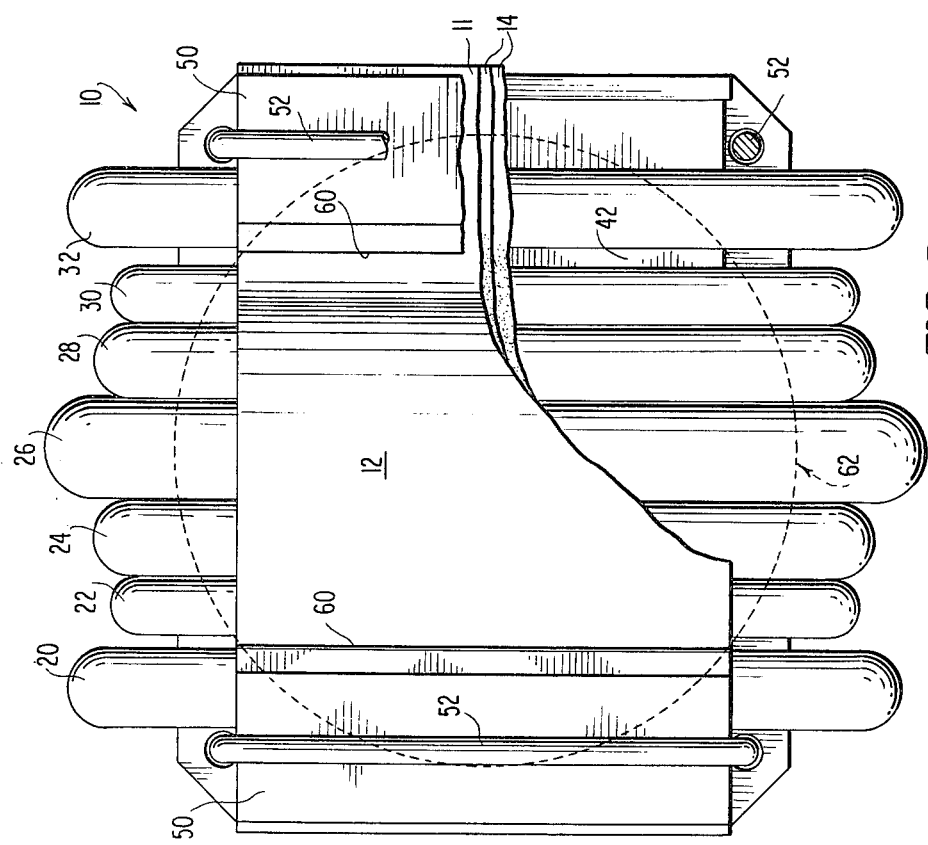
FIG. 2 is a top plan view of the laser mirror with parts broken away to show a portion of the cooling structure provided therein.

Referring now to FIGS. 1 and 2, the housing 16 is provided with a pressure block 50 on each side thereof. Each pressure block is secured to the housing 16 by means of a generally U-shaped pressure bolt 52 which extends over the pressure block and is secured to the housing by means of adjustable wing nuts 54. The purpose of the pressure blocks is to operate on the reflective surface 12 in such a way as to direct stray photons which appear at the outer circumference of the laser beam back into the usable area of the reflected beam.

This purpose is accomplished by the coaction between the pressure blocks 50 and coolant conduits 20, 22, 30 and 32 in the following manner: As seen in the right-hand side of FIG. 1, the reflective surface 12 is "pinched" between an edge 60 of the pressure block and the two coolant conduits 30, 32. As previously discussed, the conduit 32 is vertically adjustable such that the curvature of the mirror may be altered thereby against the downward pressure exerted by the pressure block edge 60. As the mirror is urged upward by the conduit 30, downward by the edge 60, and again upward by the conduit 32, an inflection point is created in the mirror surface at a small distance X from the edge 60. Thus, stray photons at the outer circumference of the beam which are incident upon the mirror within the small distance X from the pressure block edge 60 are directed inwardly rather than outwardly, so that they are reflected back within the main body of the reflected beam.

The mirror housing 16 is provided at the bottom thereof with a stem member 60 attached thereto which supports the housing 16 and serves to adjustably secure the same to a fixed base 62. A supporting structure similar to the configuration disclosed herein is disclosed in my copending application Ser. No. 952,886, the disclosure of which is incorporated by reference herein.

The stem member 60 is secured at its lower end to a connecting plate 64 which is in turn connected as by bolt 66 to a large magnet 68. The magnet is supported by a concave dish 69 of spherical symmetry and is connected thereto by the attraction between the dish and the magnet. As seen in FIG. 1, the magnet is generally formed in the shape of a "U" having arms 70 and 72 which project toward the dish 69. The ends of the arms 70 and 72 are machined such that the end surfaces thereof are provided with a spherical curvature complementary to that of the dish 69.

While the dish remains fixed in position, the mirror and its housing 16 may be angularly adjusted with respect thereto. As is seen in FIG. 1, the connecting plate 64 is provided with a plurality of apertures 80 around the periphery thereof. These apertures, which preferably are three in number, each receive the hooked end 82 of a generally L-shaped connecting rod 86. The rods 86 extend radially outwardly from the plate 64 through a circumferentially disposed flange 88 of the dish 69 through apertures provided therein. The ends of the rods 86 thus protruding from the radially outward surface of flange 88 are provided with wing nuts 84 which may be rotated by hand. The rotation of the wing nuts 84 serves to pull the plate 64, stem 60 and magnet 68 toward the nut 84, thus causing angular displacement of the mirror 10. The coacting spherical surfaces of the magnet 68 and the dish 69 slide smoothly over one another during this procedure, thus facilitating the angular adjustment of the mirror. The provision for at least three connecting rods 86 allows the mirror to be fully adjustable within the spherical angle subtended by the dish 69.

As shown in FIG. 1, a radius drawn from a point on the interior surface of the dish 69 intersects a point 90 on the surface of the mirror 12 corresponding to the center point of the incident laser beam. In other words, the inner surface of the dish 69 is spherically symmetrical about the point 90. Therefore, when the angularity of the mirror is adjusted by the wings nuts 84, the position of the reflected beam is accordingly angularly displaced. However, since the curvature of the mirror surface 12 is not affected by this displacement, the pattern of the reflected beam is not altered. If the target is planar, the reflected beam pattern will be generally in the form of an elongated rectangle due to the cylindrical shape of the mirror 12.

Figure 3:
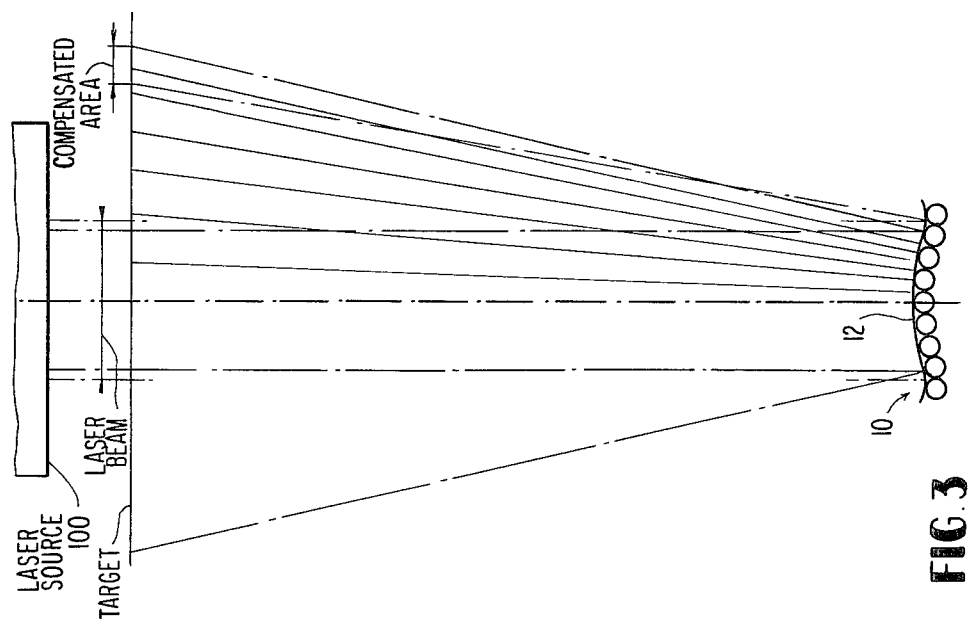
FIG. 3 is a schematic illustration of an incident beam and the corresponding beam as reflected from the mirror surface.

The operation of the device will now be described with respect to the schematic illustration of FIG. 3. As seen in this Figure, a laser 100 emits a generally cylindrical beam of laser light toward the mirror 10, the direction of the incident and reflected beams being denoted by arrows. Due to the cylindrical curvature of the mirror, the reflected beam pattern is generally in the form of an elongated rectangle, the length of which may be adjusted by altering the geometry of the mirror surface by adjusting the cooling conduits as previously described. In addition to merely changing the length of the reflected pattern, the curvature of the mirror may be adjusted so that the energy density of the reflected beam is approximately uniform throughout the reflected pattern.

As the source 100 of the incident beam is located at a distance from the mirror 10, there will be a slight dispersion of the beam, and accordingly, a number of photons will have strayed from the outer circumference of the cylindrical beam. These "stray" photons are redirected into the main portion of the reflected beam by means of the concave cylindrical portions formed at the ends of the mirror by the pressure blocks, as previously described, thereby preventing portions of the incident beam from being lost to the system.

Although not part of this invention, the target used for the reflecting beam may be a flat surface. As described in my copending application Ser. No. 952,886, this flat surface may be a band of paper to which ink has been applied. The intense coherent light from the laser may thus be used in the curing or drying of such inks without affecting the paper surface.

What is claimed is:
1. A liquid or gas cooled laser mirror, comprising:
 (a) a curved reflector element for spreading a beam of coherent laser light, and
 (b) coolant conduit means in abutting relationship with said reflector element for cooling said reflector element and for controlling the curvature of said reflector element,
 wherein said coolant conduit means comprises a plurality of individually vertically adjustable conduits.

2. A liquid or gas cooled laser mirror as defined in claim 1, wherein said conduits are supported by a plurality of vertically adjustable supporting means.

3. A liquid or gas cooled laser mirror, comprising:
 (a) a cylindrically curved reflector element for spreading a beam of coherent laser light, and
 (b) vertically adjustable cooling means in abutting relationship with said reflector element for cooling said reflector element, wherein said cooling means comprises a plurality of independent cooling conduits, each of which is supported for vertical movement for adjusting the curvature of said reflector element.

4. A liquid or gas cooled laser mirror according to claim 2 or 3, wherein said supporting means comprises a plurality of guide blocks, each said guide block supporting one coolant conduit.

5. A liquid or gas cooled laser mirror according to claim 4, wherein said guide blocks are supported by a plurality of thumb screws, said thumb screws being operable to raise or lower each said guide block and its associated coolant conduit.

6. A liquid or gas cooled laser mirror as defined in claim 4, further comprising a housing for partially enclosing said reflector element, said coolant conduits, and said guide blocks, and a base for slidably supporting said housing.

7. A liquid or gas cooled laser mirror according to claim 6, wherein said base comprises a spherically concave dish.

8. A liquid or gas cooled laser mirror as defined in claim 7, wherein said housing is connected to said base by means of a magnet.

9. A liquid or gas cooled laser mirror as defined in claim 8, wherein said magnet is connected to said housing by means of a shaft.

10. A liquid or gas cooled laser mirror as defined in claim 8, wherein said magnet is movable within said concave dish to angularly adjust said mirror with respect to said concave dish.

11. A liquid or gas cooled laser mirror, comprising:
    (a) a housing,
    (b) a fixed base for slidably supporting said housing,
    (c) a cylindrical mirror element partially enclosed by said housing,
    (d) means for cooling and adjusting the curvature of said mirror element, and
    (e) a plurality of independent vertically adjustable guide blocks, wherein said means for cooling and adjusting the curvature of said mirror comprises a plurality of individual coolant conduits, each said conduit being supported for vertical movement by one of said guide blocks, said conduits being maintained in abutting relationship with said mirror element.

12. A liquid or gas cooled laser mirror as defined in claim 11, wherein said housing further comprises a pair of pressure blocks for holding said mirror and for creating an inflection line at the outward ends of said mirror.

13. A liquid or gas cooled laser mirror as defined in claim 12, wherein said mirror surface has a convex cylindrical curvature over a major portion thereof, and a concave generally cylindrical curvature at its ends.

14. A liquid or gas cooled laser mirror as defined in claim 13, wherein said concave portions reflect incident light in a convergent manner, thereby redirecting light incident upon said concave portions back into the reflected beam.

15. A liquid or gas cooled laser mirror comprising:
    (a) a housing,
    (b) a cylindrical mirror element partially enclosed by said housing, said mirror element having a reflective surface and a rear surface,
    (c) means in abutting relationship with the rear surface of said mirror element for cooling and adjusting the curvature of said mirror element, and
    (d) a pair of pressure blocks provided on said housing and operable to engage the reflective surface of said mirror in a line contact,
    wherein said pressure blocks and said means for cooling and adjusting the curvature of said mirror coact in a manner such that lines of inflection are formed in said mirror at a distance from an edge portion of said pressure blocks.

16. A liquid or gas cooled laser mirror as defined in claim 15, wherein the curvature of said mirror is cylindrically concave between said pressure blocks and said inflection lines, and cylindrically convex in the area between said inflection lines, whereby incident light impinging upon said mirror at points between said inflection lines and said pressure blocks is redirected into that portion of the reflected beam emerging from said convex surface.

* * * * *